United States Patent [19]

Goffe

[11] 4,009,028
[45] Feb. 22, 1977

[54] REVERSAL MIGRATION IMAGING SYSTEM

[75] Inventor: William L. Goffe, Webster, N.Y.

[73] Assignee: Xerox Corporation, Stamford, Conn.

[22] Filed: Apr. 2, 1975

[21] Appl. No.: 564,241

Related U.S. Application Data

[62] Division of Ser. No. 454,515, March 25, 1974.

[52] U.S. Cl. .................................. 96/1 PS; 96/1.5; 96/1 PE
[51] Int. Cl.$^2$ ......................................... G03G 5/04
[58] Field of Search ................... 96/1 PS, 1 PE, 1.5

[56] References Cited

UNITED STATES PATENTS

| | | | |
|---|---|---|---|
| 3,551,313 | 12/1970 | Walsh | 204/181 |
| 3,689,399 | 9/1972 | Ota | 204/299 |
| 3,689,400 | 9/1972 | Ota | 204/299 |
| 3,767,392 | 10/1973 | Ota | 96/1 R |
| 3,772,013 | 11/1973 | Wells | 96/1.3 |
| 3,804,620 | 4/1974 | Wells | 96/1.3 |
| 3,850,627 | 11/1974 | Wells | 96/1.3 |

*Primary Examiner*—John D. Welsh

[57] ABSTRACT

A reversal migration imaging system comprising erasing imaged migration imaging members and fabricating, layer configuration migration imaging members is disclosed.

1 Claim, 29 Drawing Figures

REVERSAL MIGRATION IMAGING SYSTEM

This application is a divisional application of copending application Ser. No. 454,515, filed Mar. 25, 1974.

BACKGROUND OF THE INVENTION

This invention relates generally to migration imaging systems and more specifically, to a process of reversal migration imaging whereby an imaged migration imaging member may be fabricated.

A migration imaging system capable of producing high quality images of high density, continuous tone and high resolution has been developed. Such imaging systems are disclosed in copending U.S. applications Ser. Nos. 837,780 and Ser. No. 837,591, both filed June 30, 1969, both of which the entire contents of which are hereby incorporated herein by reference. In a typical embodiment of these migration imaging systems, an imaging member comprising a substrate, a layer of softenable material containing electrically photosensitive migration material is latently imaged, e.g., by electrically charging the member and exposing the charged member to a pattern of activating electromagnetic radiation, such as light. When the photosensitive migration material is originally in the form of a fracturable layer located at the upper surface of the softenable material, particles of the migration material in the exposed areas of the migration member migrate toward the substrate when the member is developed by decreasing the resistance of the softenable layer sufficient to allow migration of the migration material in depth in the softenable material.

Various methods for developing, i.e., reducing the resistance of the softenable material to migration of the migration material, the latent image in migration imaging systems are known. These various development modes include solvent wash-away and softening the softenable material, e.g., by solvent vapors softening, heat softening and combinations thereof, as well as other methods of reducing the resistance of the softenable material to allow migration of the migration material in depth in the softenable material.

In the solvent wash-away development method, migration material migrates in imagewise configuration in depth in the softenable layer as the softenable layer is dissolved, leaving an image of migrated particles corresponding to the desired image pattern on a substrate, with the softenable layer and umigrated migration material substantially completely washed away.

The imaging system disclosed in copending application Ser. No. 460,377, filed June 1, 1965, the entire contents of which is hereby incorporated by reference, generally comprises a combination of process steps which include forming a latent image on a migration imaging member and developing with solvent liquid or vapor or heat or combinations thereof to render the latent image visible. In certain methods of forming the latent image, non-photosensitive or photosensitively inert, fracturable layers and particulate material may be used to form images, as described in copending application Ser. No. 483,675, filed Aug. 30, 1965, the entire contents of which is hereby incorporated herein by reference, wherein a latent image is formed by a wide variety of methods including charging in imagewise configuration through the use of a mask or stencil; first forming such a charge pattern on a separate photoconductive insulating layer according to conventional xerographic reproduction techniques and then transferring this charge pattern to the imaging member by bringing the two layers into very close proximity and utilizing breakdown techniques as described, for example, in Carlson, U.S. Pat No. 2,982,647 and Walkup, U.S. Pat. Nos. 2,825,814 and 2,937,943. In addition, charge patterns conforming to selected, shaped electrodes or combinations of electrodes may be formed by the "TESI" discharge technique as more fully disclosed in Schwertz, U.S. Pat. Nos. 3,023,731 and 2,919,967 or by the techniques described in Walkup, U.S. Pat. Nos. 3,001,848 and 3,001,849 as well as by electron beam recording techniques, for example, as disclosed in Glenn, U.S. Pat. No. 3,113,179.

Once a migration imaging member has been developed, i.e., the resistance of the softenable material reduced sufficiently to allow migration of the migration material in depth in the softenable material, and the migration material has, in fact, migrated, then there is no known technique for erasing this image.

There has recently been discovered a system which overcomes this problem of erasing imaged migration imaging members.

Furthermore, the fabrication of layer configuration migration imaging members, i.e., the placing of the migration layer material on or embedded in the surface of the softenable material, has been accomplished by various techniques which include dip coating, roll coating, gravure coating, vacuum evaporation, and other techniques. However, the instant invention overcomes many of the disadvantages of forming, i.e., fabricating, layer configuration migration imaging members by the use of reversal migration imaging.

SUMMARY OF THE INVENTION

It is, therefore, an object of this invention to provide a method of erasing imaged migration imaging members by a reversal migration imaging process.

It is a further object of this invention to provide a method of preparing or fabricating layer configuration migration imaging members by a reversal migration imaging process.

The foregoing objects and others are accomplished by providing: (1) an imaging member comprising a layer of softenable material containing a layer of migration material whereby the migration material is migrated in image configuration to form an imaged migration imaging member. A reverse migration force is then applied to the member to cause the imagewise migrated migration material to migrate in the opposite direction of the first imagewise migration of migration material back to the layer of migration material, i.e., background, while the softenable material is in a sufficiently softened condition to allow migration of the migration material thereby erasing the migration image. (2) An imaged layer configuration migration imaging member is subjected to a reverse migration imaging force while the softenable material is in a sufficiently softened condition to allow migration whereby the imagewise migrated material returns to its original position in the layer of migration material thereby erasing the migration image. (3) A member comprising a substrate overcoated with a layer of softenable material which contains a layer of migration material located contiguous or contacting the softenable material-substrate interface is subjected to an imagewise migration force sufficiently to cause imagewise migration of the migration material away from the softenable material-substrate interface and toward the free surface of the softenable material. The softenable material and imagewise migrated migration material may then be removed, e.g., by washaway development, whereby a dense complementary image of unmigrated migration material remains on the substrate. (4) An imaging member comprising a substrate overcoated with a layer of softenable material containing a layer of migration material contiguous or contacting the softenable material-substrate interface whereby a uniform migration force is applied to the imaging member to cause migration while the softenable material is in a sufficiently softened condition to allow migration of essentially the entire layer of migration material away from the softenable material-substrate interface and toward the free surface of the softenable material thereby forming a normal layer configuration migration imaging member.

BRIEF DESCRIPTION OF THE DRAWINGS

For a better understanding of the invention as well as other objects and further features thereof, reference is now made to the following detailed disclosure of this invention taken in conjunction woth the accompanying drawings wherein.

DESCRIPTION OF THE PREFERRED EMBODIMENTS

Figure 1A:
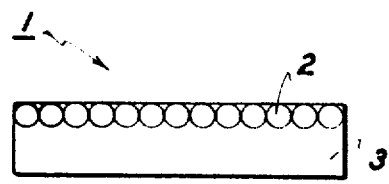
FIGS. 1 are partially schematic drawings representing forming a latent image on a layer configuration migration imaging member, developing that member, i.e., forming a imaged migration member and applying a reverse migration imaging force to cause the migrated migration material to migrate back it its original position in the layer configuration while the softenable material is softened sufficiently to allow reversal migration of the migration material thereby erasing the image. The erased member is then reimaged illustrating that the member may be imaged and erased as many times as desired.

Referring now to FIG. 1A which shows a schematic drawing of one of the embodiments which comprises an imaging member 1 which comprises electrically insulating softenable layer 3 which contains a layer of migration material 2.

Softenable layer 3, may be any suitable material, typically a plastic or thermoplastic material, which is capable of having its resistance to migration reduced sufficiently to allow migration of the migration material in depth in the softenable material. Futhermore, as a specific preferred embodiment of development, the softenable material should be capable of being soluble in a solvent or softenable, for example, in a solvent liquid, solvent vapor, heat or combinations thereof. Softenable layers which allow charge injecting which results in the removal of the coulombic migration force on the particles before reverse migration has occurred, are to be avoided. Therefore, the softenable material should be capable of retaining an electrical or electrostatic charge, which is sufficient to cause reverse migration to occur, on its surface for from about 0.1 to about 30 seconds subsequent to the beginning of the step of softening the softenable material sufficient to allow reverse migration to occur. Preferably, the softenable material should have a softening range of at least about 10° C. and initial softening point of less than about 90° C. and a surface melt viscosity in the range between about $10^4$ to $10^9$ poise.

"Softenable" as used herein to depict softenable layer 3 is intended to mean any material which can be rendered by the development step thereof or the softening step hereof more permeable to particles migrating through its bulk.

Softenable materials which are to be used for softenable layer 3 are materials which will, under certain circumstances, i.e., during reversal migration, while the softenable material is in a soft condition sufficient to allow reverse migration of the migration material, i.e., the migration particles are attracted to the surface of the softenable material which will result in the particles migrating to a position which will erase the migrated image, must be capable of retaining equal and opposite charges on its free surface, i.e., the free surface of the softenable material, sufficient to allow reverse migration of the oppositely charged migrated migration particles to occur.

Upon uniform charging of free surface of the softenable material, it is preferred that the softenable material hold the charges on the surface for a sufficient time in order for the migration particles with opposite charges to migrate up through the film toward the surface which contains this charge before the charge is dissipated.

Typically preferred substantially electrically insulating softenable material includes a host of plastic and thermoplastic material, examples of which are specifically recited in copending application Ser. No. 837,780, filed June 30, 1969, the entire contents of which is hereby incorporated by reference; paraffins and waxes and other materials which are typically substantially electrically insulated, and capable of having its resistance to migration reduced to allow migration of the migration material may be used in the advantageous system of the present invention. Such substantially electrically insulating softenable materials will typically have resistivities not less than about $10^{10}$ ohms-cm, and preferably have resistivities not less than about $10^{12}$ ohms-cm.

Especially preferred substantially electrically insulating softenable materials include copolymers of styrene and hexylmethacrylate; copolymers of styrene and n-butyl-methacrylate; copolymers of stryene and octylacrylate; copolymers of styrene and t-decylate-styrene and copolymers of methyl methacrylate and t-decylate-styrene.

Softenable layer 3 may be any suitable thickness, with thicker layers generally allowing greater reverse migration to occur. Softenable layer thicknesses from about ½ to about 16 microns are found to be preferred.

Figure 1B:
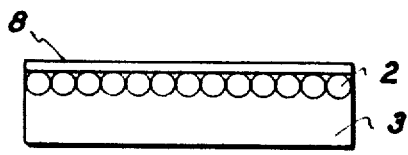

Softenable layer 3 is illustrated in FIG. 1B with the advantageous surface skin layer 8 formed at one of the free surfaces faces of the softenable material. The advantageous surface skin 8 may either be formed as a substantially continuous layer at the surface of softenable layer 3 or as a discontinuous layer, such as distinct, separate skin portions upon the softenable layer arranged, for example, as closely spaced dots. Any suitable method may be used to form the surface skin layer 8. Where the imaging member includes a layer of migration material, the surface skin layer 8 should be formed after the layer of migration material is applied at the upper surface of the softenable layer 3. The surface skin layer 8 may typically be formed either by coating a layer of skin material over the softenable layer 3, or by changing the properties of the surface of the softenable layer in situ. Furthermore, surface skin 8 may be of high viscosity material which is formed on the surface of softenable layer 3 either by modification of the surface of the softenable layer 3 or by coating a layer of another material thereon. Alternatively, surface skin 8 may comprise a chemical composition different from the bulk of softenable material 3, but be part of the single layer of softenable material 3. Therefore, softenable material 3 may comprise a single layer wherein a portion of softenable layer 3 comprises a surface skin 8 having a chemical composition different from the bulk of softenable material 3 and having a thickness not greater than about 0.3 micron and a viscosity during development of the member greater than that of the bulk of said softenable material. Furthermore, the softenable layer may contain a surface skin located on at least one entire free surface of the softenable layer formed by exposing the free surface to hardening radiation sufficiently to form surface skin 8 having a thickness in the range not greater than about 0.3 micron and having a viscosity during imaging of said member greater than the viscosity of the softenable material of said softenable layer 3.

Typical methods for forming surface skin layer 8 include exposure to actinic light, x-rays, beta rays, gamma rays, electrical bombardment, corona charging, high voltage discharge, exposure to visible light, exposure to air, contact with chemical means such as oxidizing agents and/or linking agents, overcoating with a high viscosity material which migrates to the surface of the softenable layer as the softenable layer cures, or any other chemical, physical or radiative means capable of forming the surface skin layer having a viscosity greater than the viscosity of the bulk of softenable layer 8.

Surface skin 8 should be substantially electrically insulating and capable of retaining an electrical or electrostatic charge, which is sufficient to cause reverse migration to occur, on its surface for about 0.1 to about 30 seconds subsequent to the beginning of the softening step required to allow reverse migration to occur.

As mentioned above, the softenable material may be a single layer of softenable material where the entire upper portion of the softenable layer is a surface skin having a chemical composition different from the bulk of softenable material and having a thickness not greater than about 0.3 micron and a viscosity during imaging of said member greater than that of the bulk of the softenable material. The preferred surface skin in the above described embodiment may be any suitable material, for example, a phenol formaldehyde resin; a mixture of polystyrene and acrylate polymers; or a phenol formaldehyde resin selected from the group consisting of p-tertarybutyl phenol formaldedhyde resin and p-phenyl phenol formaldehyde resin. The above listing of materials is merely a representative example of the preferred materials which may be used as surface skins. These materials should be substantially electrically insulating and capable of retaining an electrical or electrostatic charge, which is sufficient to cause migration to occur, on its surface for about 0.1 to about 30 seconds subsequent to the beginning of the softening of the softenable material sufficient to allow reverse migration to occur.

In various embodiments of the novel reverse migration imaging system of the present invention, the softenable material may be overcoated with an overlayer. Suitable material which may be used as the overlayer is typically substantially electrically insulating which are capable of retaining an electrostatic charge, which is sufficient to cause reverse migration to occur, on its surface for about 0.1 to about 30 seconds subsequent to the beginning of the softening step necessary to allow reverse migration to occur. The preferred overlayer material comprises phenol formaldehyde resin; mixtures of polystyrene; mixtures of polystyrene and acrylic polymers. The phenol formaldehyde resin may be selected from the group consisting of p-tertarybutyl phenol formaldehyde resin and p-phenyl phenol formaldehyde resin.

A more detailed description and listing of the various surface skins suitable for use in the instant invention is disclosed in copending application Ser. No. 6,862, filed Jan. 29, 1970, the entire contents of which is hereby incorporated herein by reference. Furthermore, for a more detailed listing of suitable materials, which may be used as overlayer materials, may be found in more detail in copending application Ser. No. 424,033, filed Dec. 12, 1973, the entire contents of which is hereby incorporated by reference.

Migration layer 2, portions of which migrate towards or to the substrate during normal migration imaging under the influence of normal migration forces is disclosed in copending U.S. patent application Ser. No. 837,780, filed June 30, 1969. Upon applying a reverse migration force to the migrated migration material sufficient to cause migration, the migrated image pattern migrates back toward the background material when the softenable material is softened sufficiently to allow migration thereby erasing the image pattern. Layer 2 may be a fracturable layer or a particulate layer. Layer 2 may be continuous or a semi-continuous layer, such as a fracturable layer in a swiss cheese pattern, which is capable of breaking up in discrete particles of the size of an image element or less during the development step permitting portions to migrate toward the substrate in image configuration.

Typical layer configuration migration imaging members which may be used in the instant invention, are disclosed in copending U.S. application Ser. No.

837,780, filed June 30, 1969, the entire contents of which is hereby incorporated by reference herein.

The thickness of layer 2 is preferably from about 0.01 to about 2.0 microns thick although 5 micron layers have been found to give good results for some materials.

When layer 2 comprises particles, a preferred average particle size is from about 0.01 to about 2.0 microns. Layers of particle migration material preferably should have a thickness ranging from about the thickness of the smallest element of migration material in the layer to about twice the thickness of the largest element in that layer. It should be recognized that the particles may not all be packed tightly together laterally or vertically so that some of the thickness of layer 2 may constitute softenable material.

Layer 2 may comprise any suitable material selected from an extremely broad group of materials and mixtures thereof including electrical insulator, electrical conductors, photosensitive materials and optically inert particles. For the modes hereof employing an electrical reverse migration force, the migrating portions of layer 2 should be sufficiently electrically insulating to hold their electrical charge until the desired amount of migration has occurred. Conductive particles may be used if lateral conductivity is minimized by loose packing so that neighboring particles are in poor electrical contact.

Migration material, preferably, should be substantially insoluble in the softenable material and otherwise not adversely reactive therewith, and in any solvent liquid or vapor which may be used in the softening step hereof. Photosensitive materials for layer 2 permit the imaging member hereof to be imaged and erased by the optimum electrical-optical mode hereof, to be further described, which is a simple, direct, optically sensitive method of producing high quality images which may then be erased by applying a reverse migration force, according to this invention. Typical such photosensitive materials include inorganic or organic photoconductive insulating materials; materials which undergo conductive changes when photoheated, for example, see Cassiers, Photog. Sci. Engr. 4. No. 4, 199 (1960); materials which photoinject or inject when photoheated.

While photosensitive materials may be used in the preferred electrical reverse migration force mode, employing electrostatic forces, any suitable non-photosensitive migration material, such as graphite, dyes, starch, garnet, iron oxide, carbon black, iron, tungsten and mixtures thereof may be used as described in copending application Ser. No. 483,675, filed Aug. 30, 1965. the entire contents of which is hereby incorporated by reference herein.

While photoconductive particles, (and "photoconductive" is used in its broadest sense to mean particles which show increased electrical conductivity when illuminated with electromagnetic radiation and not necessarily those which have been found to be useful in xerography in xerographic pigment-binder plate configurations) have been found to be a class of particles useful is "electrically photosensitive" particles in this invention and while the photoconductive effect is often sufficient in the present invention to provide an electrically photosensitive material, it does not appear to be a necessary effect. Apparently, the necessary effect according to the invention is the selective relocation of charge into, within or out of the material or particles, said relocation being effected by light acting on the bulk or surface of the electrically photosensitive material, by exposing said material or particle to activating radiation which may specifically include photoconductive effects, photoinjection, photoemission, photochemical effect and others which cause said selective relocation of charge.

Figures 1C, 1D:
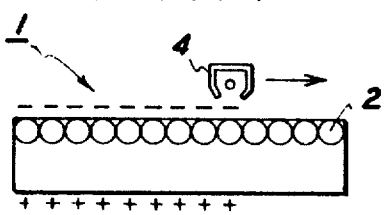
Figures 1E, 1F:
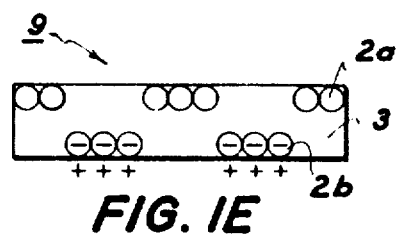
Figure 1G:
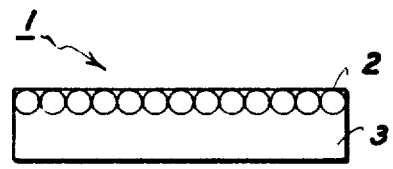
Figure 2A:
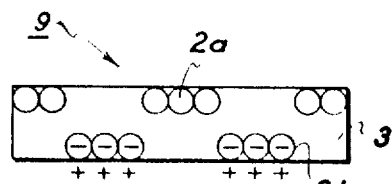
FIGS. 2 are partially schematic drawings representing an imaged layer configuration migration imaging member and the steps of applying a reverse migration force to cause migration of the migration material back to its original position in the layer of migration material thereby erasing the image. The erased member is then reimaged illustrating that the member may be imaged and erased as many times as desired.
Figure 2C:
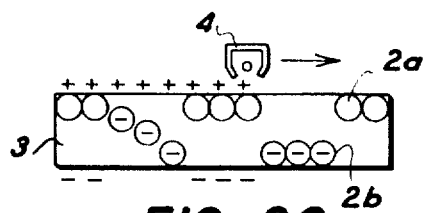
Figure 2D:
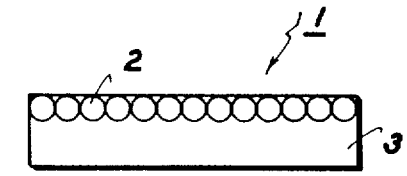
Figure 3A:
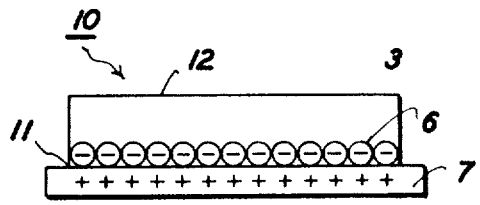
FIGS. 3 are partially schematic drawings representing a member with a layer of migration material located at the softenable material-substrate interface and the steps of applying an imagewise migration force to cause imagewise migration of the migration material away from the substrate and removing the softenable material and imagewise migrated material whereby a dense complementary image remains on the substrate.
Figure 3B:
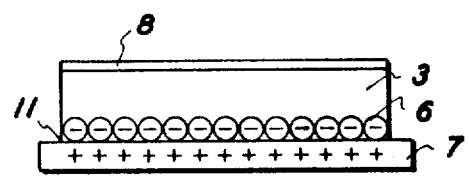
Figure 3C:
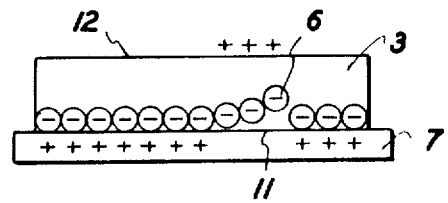
Figure 3D:
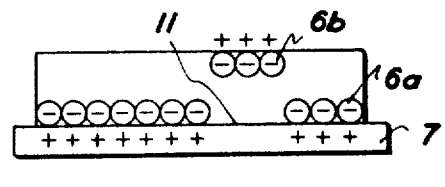
Figure 3E:
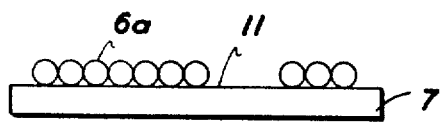
Figure 4A:
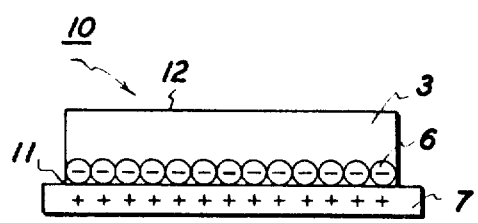
FIGS. 4 are partially schematic drawings representing a member where the layer of migration material is located at the softenable material-substrate interface and the steps of applying a uniform migration force to the member while the softenable material is softened sufficiently to allow migration whereby the entire layer of migration material migrates away from the interface towards the free surface of the softenable material thereby forming a layer configuration migration imaging member. This member is then imaged by normal migration imaging techniques.

Referring now to the reverse imaging methods of this invention which include (1) forming a latent image on layer 2 of member 1 as illustrated in FIGS. 1C and 1D and developing that member, i.e., forming an imaged migration member, as illustrated in FIG. 1E and then applying a reverse migration imaging force, as illustrated in FIG. 1F, to cause the migrated migration material 2b to migrate back to its original position in layer 2 while the softenable material 3 is softened sufficiently to allow reverse migration to occur thereby erasing the image as illustrated in FIG. 1G. (2) Imaged migration imaging member 9, as illustrated in FIG. 2A is subjected to a reverse migration force, as illustrated in FIG. 2C, to cause migration of the migration material 2b to its original position in the layer of migration material thereby erasing the image, as illustrated in FIG. 2D. (3) Member 10, as illustrated in FIG. 3A, where the layer of migration material is located at the softenable material-substrate interface 11, is subjected to an imagewise migration force as illustrated in FIGS. 3C and 3D to cause imagewise migration of the migration material away from the substrate thereby leaving the complementary image on the substrate, as illustrated in FIG. 3D. The member may then be washaway developed thereby removing the softenable material and the imagewise migrated migration as illustrated in FIG. 3E. (4) Member 10, as illustrated in FIG. 4A, where the layer of migration material is located at the softenable material-substrate interface 11, is subjected to a uniform migration force as illustrated in FIG. 4C to cause migration of substantially the entire layer of migration material 6 away from interface 11 and toward surface 12 of softenable layer 3 thereby forming layer configuration migration imaging member 13, as illustrated in FIG. 4D.

Modes of imaging migration imaging members as illustrated in FIGS. 1A – 1E are taught in copending U.S. application Ser. No. 837,780, filed June 30, 1969, the entire contents of which are hereby incorporated by reference herein. These modes include (1) applying to the migration layer material 2 an imagewise migration force, as illustrated in FIGS. 1C and 1D, which typically is associated with a latent imagewise charge on the imaging member, which causes directly or indirectly a force on the migration layer towards the bulk of the softenable layer and typically towards a face of the softenable layer or, where a substrate is used, towards the substrate-softenable layer interface; said imagewise migration force applying step occurring before, during or after the development step of reducing the resistance of the softenable material to migration of the migration material sufficiently to allow migration of the migration material in depth in the softenable material and (2) applying to the migration layer material an imagewise migration force during or after the development step of reducing the resistance of the softenable material to migration of the migration material sufficiently to allow migration of the migration material in depth in the softenable material to form a member, as illustrated in FIG. 1E.

There are a variety of forces which can be applied to and can be made to act on the migration layer in image configuration to cause migration of the migration material in depth in the softenable material, as illustrated in FIGS. 1A – 1E. Such forces include electrical or electrostatic, magnetic, gravitational, and centrifugal forces.

Modes of applying reverse migration forces to the migration layer include (1) applying charges opposite to those on the migrated migration material to produce an attraction of the migrated migration material to the opposite polarity charges on the opposite surface of the softenable layer as illustrated in FIGS. 1F, 2C, 3C and 4C; (2) applying an imagewise or uniform external electric field acting on either uniformly or imagewise charge migration material; (3) applying a uniform or imagewise magnetic field acting upon either a uniform or imagewise magnetized migration layer; (4) applying centrifugal forces to the migration material; and (5) applying gravitational forces to the migration material. All the above mentioned forces may be applied either imagewise or uniformly depending upon whether or not imagewise migration is to be accomplished. Furthermore, the reverse migration force may be accomplished by imagewise softening of the softenable material to allow reverse migration of the migration material.

Referring now specifically to the imaging modes hereof and to FIGS. 1A – 1G. FIG. 1A shows a partial schematic of a layer configuration migration imaging member 1 comprising softenable layer 3 and a layer of migration material 2. FIG. 1B illustrates a layer configuration migration imaging member, comprising softenable material 3, a layer of migration material 2 and an overlayer of surface skin 8.

Referring now to FIG. 1C, a latent image is formed by the optimum electrical-optical mode hereof, in member 1 where layer 2 comprises photosensitive materials by the preferred method comprising the steps of uniformly charging with a corona device (FIG. 1C) and imagewise exposing (FIG. 1D). In FIG. 1C, the imaging member is uniformly electrostatically charged, illustratively by means of a corona discharge device 4 which is shown to be traversing the member from left to right depositing a uniform, illustratively negative charge on the surface of layer 22. For example, corona discharge devices of the general description and generally operating as disclosed in Vyverberg U.S. Pat. No. 2,836,725 and Walkup U.S. Pat. No. 2,777,957, have been found to be excellent sources of corona discharging devices useful in discharge of member 1. Other charging techniques and other corona discharging devices are described in copending application Ser. No. 837,780, filed June 30, 1969.

Referring now to FIG. 1D, a second step in the embodiment of the optimum electrical-optical mode of forming the latent image after charging, member 1 is exposed to an imagewise pattern of activating radiation 5. For purposes of illustration, the surface electrical charges are depicted as having moved into particulate layer 2 in the illuminated areas. For a detailed description of more optimum processes of forming the latent image is described in copending U.S. patent application Ser. No. 837,780.

Copending U.S. application Ser. No. 837,780, filed June 30, 1969, describes imaging systems suitable for use in the present invention in great detail, and all the disclosure therein and especially the disclosure relating to such imaging processes, imaging members and materials suitable for use in the migration imaging members used therein, is hereby expressly incorporated by reference into the present specification. Member 1 having the electrical latent image thereon, as illustrated by FIG. 1D, is developed by softening the softenable material sufficient to allow migration of the migration material through the softenable layer 3, forming imaged migration imaging member 9, as illustrated by FIGS. 1E.

The application of heat, solvent vapors, or combinations thereof, or any other means for softening the softenable material of softenable layer 3 to allow migration of the migration material 2 may be used to develop the latently imaged member, whereby migration material 2 is allowed to migrate in depth in softenable layer 3 in image configuration. FIG. 1E illustrates developed member 9 where the migration material is shown migrated as migration material 2b and the unmigrated material, i.e., background, is illustrated as migration material 2a. These members are fully described in copending U.S. patent application Ser. No. 837,780, filed June 30, 1969.

In FIG. 1F, member 9 is uniformly charged with an opposite polarity to that which is contained by the migrated charged migration material. This reverse imagewise migration force is an attraction of charged migration material 2b to charges of a polarity opposite the polarity of charges on the migrated migration material 2b. Said opposite polarity charges are deposited at the surface of the softenable material 3 thereby causing the migrated migration material 2b to migrate towards the background migration material 2a upon softening softenable layer 3 sufficient to allow reverse migration of migration material 2b. When the image pattern configuration of migration material 2b migrates to the background material 2a, the image pattern 2b is erased, as illustrated by FIG. 1G.

Figure 1H:
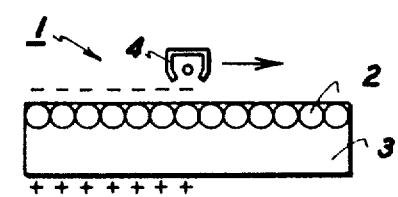
Figure 1I:
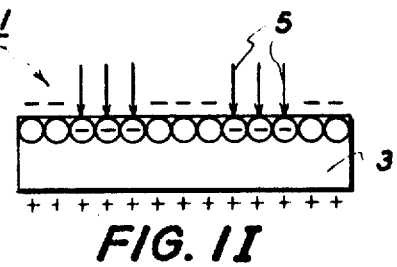
Figure 1J:
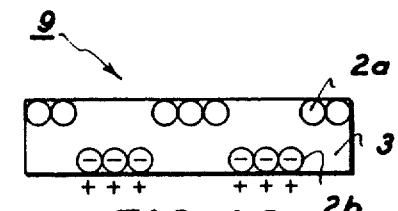

In FIG. 1H, the erased member 1, as illustrated in FIG. 1G, may be latently imaged again by the preferred method comprising the steps of uniformly charging with a corona device 4 (FIG. 1H) and imagewise exposed (FIG. 1I). Member 1, as illustrated in FIG. 1I, is again developed, by the same modes used to develop member 1 (FIG. 1D) previously discussed, by softening the softenable material sufficient to allow migration of the migration material through the softenable layer 3 forming imaged migration imaging member 9 as illustrated by FIG. 1J. This member may be erased and imaged as many times as desired.

The materials suitable for use as softenable layer 3 and migration marking material 2 are the same materials disclosed in aforementioned U.S. copending application Ser. No. 837,780, filed June 30, 1969, which is incorporated herein by reference. However, the materials suitable for layer 3 when no overlayer or surface skin is present must be capable of retaining an electrical or electrostatic charge, i.e., a charge sufficient to cause migration to occur when the softenable material is softened sufficient to allow migration, on its surface from about 0.1 to about 30 seconds subsequent to the beginning of the softening step which allows reverse migration to occur.

In various embodiments of the novel migration imaging members of the present invention, the migration material may be electrically photosensitive photoconductive, photosensitively inert, magnetic, electrically conductive, electrically insulating, or any combination of material suitable for use in instant migration imaging systems. Although the softenable layer has not been described as being coated on a substrate in some embodiments, the softenable layer has sufficient strength and integrity to be substantially self-supporting. However, it may be brought into contact with a suitable substrate during the imaging process or may contain a substrate initially.

It should be noted that layer 8 (FIGS. 1B, 3B and 4B) which may be a surface skin or overlayer, is capable of retaining an electrostatic charge, i.e., a charge sufficient to cause migration to occur when the softenable material is softened sufficient to allow migration, on its surface from about 0.1 to about 30 seconds subsequent to the beginning of the softening step which allows reverse migration to occur. In this embodiment, the softenable material 3 may be any suitable material as described in copending U.S. application Ser. No. 837,780, filed June 30, 1969, with no limitations as to the surface characteristics for retaining charge. Furthermore, these overcoatings will typically, appreciably soften when the migration imaging members are developed or erased by reverse migration imaging. However, in various embodiments, it may be advantageous to use harder overlayer materials which may permit solvent vapors to penetrate through to the softenable layers. Overlayer 8 may include materials such as Bavick 11, a copolymer of alpha methyl styrene and methyl methacrylate; Mylar, a polyester resin availabe from Dupont; Elvacet, a polyvinyl acetate resin available from Du- Pont; and others as well as mixtures and copolymers thereof.

The overlayee 8 may also be transparent, translucent or opaque depending upon the imaging system in which the overcoating member is desired for use. Where the overlayer comprises substantially electrically insulating softenable material, it will typically have resistivities not less than about $10^{10}$ ohm-cm., and preferably have resistivities of not less than about $10^{10}$ ohm-cm. Overlayer 8 is typically preferably of a thickness up to about 75 microns, although thicker overlayers may be suitable and desirable in certain embodiments. More preferably, the thickness of the overlayer generally should range from about 0.01 to 1.0 micron. A preferred range of thickness which yields outstanding results is from about 0.1 to 0.5 micron. Furthermore, the material must have the same capacity of retaining charge on its surface as mentioned above, for the surface skins or overlayer materials or the softenable material which does not contain a surface skin or overlayer.

Figure 2B:
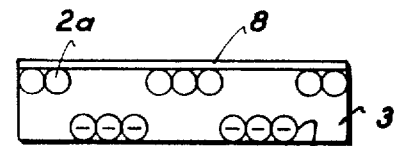

FIG. 2A illustrates an imaged migration imaging member, and FIG. 2B illustrates an imaged migration imaging member and an overlayer or surface skin 8 contained on softenable layer 3. FIG. 2A illustrates the migration material as migrated migration material 2b and unmigrated migration material 2a, i.e., background.

The member, as illustrated in 2A, is uniformly charged with a charge of the opposite polarity of that which is contained upon the migrated particles, i.e., migrated particles 2b, wherein a reverse migration force is created whereby the charged migrated migration material 2b is attracted to charges of a polarity opposite to the polarity of charges on the migrated migration material 2b. The opposite polarity charges are at the surface of the softenable material closest to the unmigrated migration material 2a, i.e., background, or a location spaced apart from said migrated migration material 2b, which causes the migrated migration material 2b to migrate to the background migration material 2a, when the softenable material is softened sufficiently to allow migration, thereby erasing the imaged migration imaging member as illustrated by FIG. 2D.

The migrated migration particles 2b may contain a charge so that when the opposite polarity charge is placed on the surface of the member in order to cause these particles to migrate. Alternatively, these particles, i.e., migrated migration particles 2b, may be charged, if sufficient time is allowed, in situ, e.g., by the same modes used to charge the member, i.e., particles, as illustrated in FIGS. 1C, 1D, 1H, 2E, 2F, 4E and 4F. Where the migrated migration particles 2b (FIGS. 1E, 1F and 2C) are photosensitive material or if the member contains a substrate 7, as illustrated in FIGS. 3A - 3D and FIGS. 4A - 4D, the substrate may be photosensitive or where the particles are photosensitive inert, the softenable material 3 may be photosensitive. A corona device may uniformly electrostatically charge the free surface of this type of member. Techniques for charging migration material through a photosensitive substrate is disclosed in copending U.S. application Ser. No. 837,780, filed June 30, 1969, and is hereby incorporated by reference into this application.

Figure 2E:
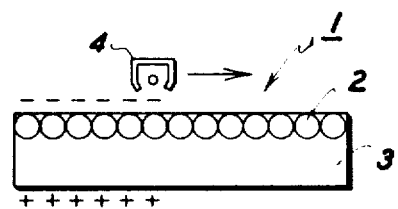
Figure 2F:
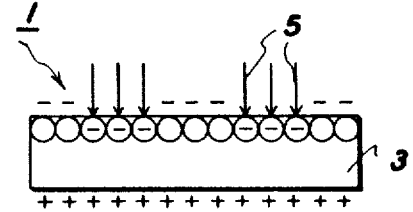
Figure 2G:
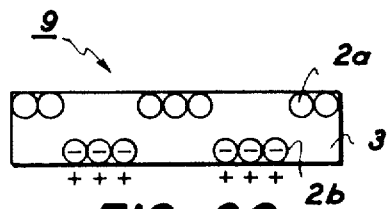

In FIG. 2E, the erased member 1 may be latently imaged by the preferred method comprising the steps of uniformly charging with a corona device 4 (FIG. 2E) and imagewise exposed (FIG. 2F). Member 1, as illustrated in FIG. 2F, is developed by softening the softenable material sufficient to allow migration of the migration material through the softenable layer 3 forming imaged migration imaging member 9, as illustrated in FIG. 2G. This member may be erased and imaged as many times as desired.

Referring now to FIG. 3A in which imaging member 10 is illustrated comprising a substrate 7, a layer of substantially insulating softenable material 3 on said substrate 7 and said softenable material 3 containing a layer of migration material 6 contiguous or contacting interface 11 of said softenable material 3 and said substrate 7, softenable material 3 is capable of having its resistance to migration of migration material decreased sufficiently to allow migration of migration material 6 in said softenable material 3. Illustrated in FIGS. 3A - 3E is the process of applying a reverse imagewise migration force to migration material 6 sufficient to cause imagewise migration of the migration material 6 away from the interface 11 and toward free surface 12, illustrated in FIG. 3C. The process of developing the imaging member 10 by decreasing the resistance of migration material 6 in depth in the softenable layer 3 at least sufficient to allow imagewise migration away from interface 11 of softenable material 3 and substrate 7 toward free surface 12 of softenable material 3, is illustrated in FIG. 3D. If softening development is used, i.e., softening of the softening material sufficient to allow migration of the migration material, softenable material 3 and imagewise migrated material 6b will remain on the member, as illustrated in FIG. 3D. However, if wash-away development is used, i.e., a solvent applied which dissolves softenable material 3, the softenable material will be dissolved and the softenable material along with the imagewise migrated material 6b will be washed away from the member resulting in unmigrated migration material 6a remaining on the substrate 7 in complementary image configuration, as illustrated in FIG. 3E.

Substrate 7 may be electrically conductive or insulating. Also, substrate 7 may be photosensitive or nonphotosensitive. Conductive substrates generally facilitate the charging or sensitizing of the member and typically may be of copper, brass, nickel, zinc, chromium, stainless steel, conductive plastics and rubbers, aluminum, steel, cadium, silver, gold or paper rendered conductive by the inclusion of a suitable chemical therein or through conditioning in a humid atmosphere to insure the presence therein of sufficient water content to render the material conductive. Suitable substrates are disclosed in copending U.S. application Ser. No. 837,780, filed June 30, 1969.

The reverse migration force may be applied by any number of known techniques. In the preferred modes an imagewise electrical or electrostatic charge is applied to surface 12, as illustrated in FIG. 3C, by charging through a stencil or a shaped electrode, etc. Surface 12 of softenable material 3 of FIG. 3C and 3D must be capable of retaining an electrical or electrostatic charge, i.e., a charge sufficient to cause migration to occur when the softenable material is softened sufficient to allow migration, on its surface from about 0.1 to about 30 seconds subsequent to the beginning of the softening step which allows reverse migration to occur.

The layer of migration comprising particles 6, illustrated in FIG. 3A, may contain a charge so that when the opposite polarity charge is placed on surface 12 of member 10, illustrated in FIG. 3A, particles 6 will migrate toward surface 12 when the softenable material is softened sufficient to allow migration of particles 6. Alternatively, particles 6 may be charged, if sufficient time is allowed, in situ, e.g., by the same modes used to charge members as illustrated in FIGS. 1C, 1D, 1H, 1I, 2E, 2F, 4E and 4F.

Member 10 of FIG. 3D is developed, i.e., the softenable material resistance to migration of the migration material is reduced sufficiently to allow migration of the migration material 6, thereby forming the member as illustrated in FIG. 3D. As mentioned, this member may be wash-away developed to form the member as illustrated in FIG. 3E. Alternatively, wash-away development may be applied to the member subsequent the member being subjected to an imagewise reverse migration force thereby dissolving the softenable material 3 and removing this material along with imagewise migrated migration material 6b. The resultant member is a dense, high compacted excellent complementary image adhered to substrate 7 which may be more permanently fixed by known fixing techniques, such as disclosed in copending U.S. patent application Ser. No. 168,739, filed Aug. 3, 1971, the entire contents of which is hereby incorporated by reference herein.

Figure 4B:
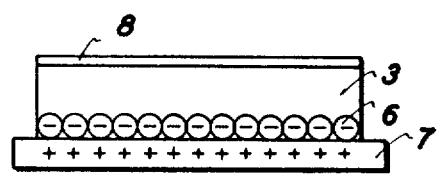
Figure 4C:
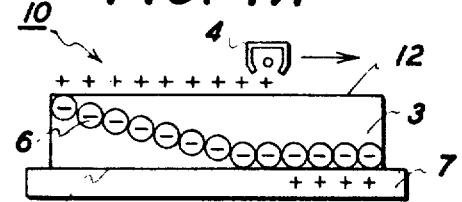
Figure 4D:
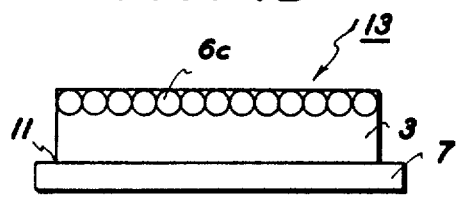

Referring now to FIGS. 4A – 4D which illustrate a method of preparing migration imaging member 13, as illustrated in FIG. 4D. FIGS. 4A – 4C illustrate a member 10 comprising substrate 7 and a layer of substantially insulating softenable material 3 on substrate 7. Softenable material 3 contains a layer of migration material 6 contiguous or contacting interface 11 of softenable material 3 and substrate 7. Softenable material 3 is also capable of being softened sufficiently to allow migration of the migration material 6 in softenable layer 3. FIG. 4C illustrates the process of applying a reverse migration force to the migration material 6 sufficient to cause migration of substantially the entire layer of migration material 6 away from the substrate 7 and towards the free surface 12 of the imaging member 10 and softening softenable layer 3 sufficient to allow migration of substantially the entire layer of migration material 6 away from the substrate 7 and towards free surface 12 of the softenable material 3 whereby member 13, as illustrated in FIG. 4D, is fabricated.

FIG. 4B illustrates the member 10 of FIG. 4A, additionally comprising an overlayer or surface skin 8. The overlayer or surface skin 8 may be of the same material as described earlier for use in member 1, illustrated in FIG. 1 or member 9, as illustrated in FIG. 2B or member 10, as illustrated in FIG. 3B. Member 10, as illustrated in FIG. 4C, may be uniformly charged with a corona charging device 4 in the same manner as described for charging member 1, illustrated in FIG. 1C.

Member 10 may be softened by the same methods as described for softening member 1, as illustrated in FIG. 1E and 1F and FIG. 2C.

The layer of migration material 6 may contain a charge or may be charged in situ as described for charging in FIGS. 2A – 2C and FIGS. 3A – 3C. Upon softening softenable material 3, layer 6 migrates away from substrate 7 and towards surface 12 thereby forming a normal migration imaging member 13, illustrated in FIG. 4D.

Figure 4E:
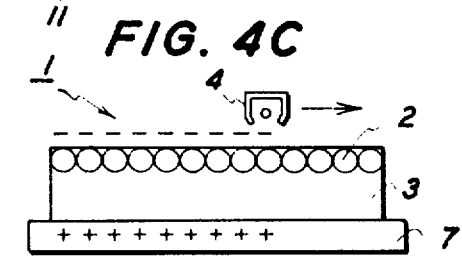
Figure 4F:
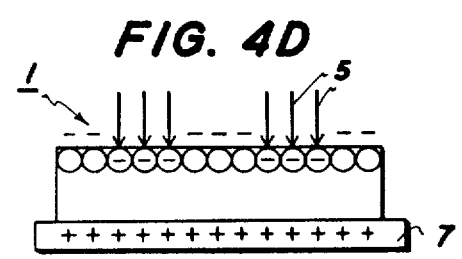
Figure 4G:
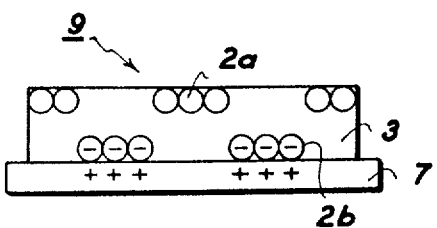

In FIG. 4E, the member 1 may be latently imaged by the preferred method comprising the steps of uniformly charging with a corona device 4 (FIG. 4E) and imagewise exposed (FIG. 4F). Member 1, as illustrated in FIG. 4F, is developed by softening the softenable material sufficient to allow migration of the migration material through the softenable layer 3 forming imaged migration imaging member 9, as illustrated by FIG. 4G. The member may be erased and imaged as many times as desired.

The following Examples further specifically define the present invention reverse migration imaging system. The parts and percentages are by weight unless otherwise indicated. All exposure are from a tungsten filament light source, unless otherwise specified. The Examples below are intended to illustrate various preferred embodiments of the reverse migration imaging system of this invention. The Examples are directed primarily to softening development since wash-away development is amply described in Goffe, U.S. Pat. No. 3,520,681.

EXAMPLE I

An imaging member is produced by preparing a softenable material comprising about a 12 weight solution of a custom synthesized about 80/20 mole percent copolymer of styrene and hexylmethacrylate having a molecular weight of about 41/300, intrinsic viscosity in toluene at about 25° C. of about 0.16. The softenable material is then coated onto an aluminized Mylar substrate with a gravure roller and then allowed to dry. The softenable material has a thickness of approximately 2 microns. The surface of the softenable material is then coated with amorphous selenium by the vacuum deposition process as fully described in copending appliction Ser. No. 813,345, filed Apr. 3, 1969. Vacuum evaporation of selenium onto the softenable layer results in an layer of particulate selenium being formed, having average particle size of about 0.7 micron. This member, i.e., the surface of the softenable material containing the layer of particulate selenium, is then laminated with aluminized Mylar substrate by using a hot roller (100° C.) and then the member is allowed to cool. Then the first layer of aluminized Mylar opposite the side of the member containing the layer of selenium is stripped away thereby forming a member comprising a 2 micron layer of softenable material with the selenium layer near the softenable layer-substrate interface.

This imaging member is uniformly electrostatically charged using a corona device to a surface potential of positive 200 volts, imagewise exposed to activating electromagnetic radiation, here light, of approximately 5 ergs/cm$^2$ of 4,000 angstroms light through a photographic transparency in contact with the member. Then the member is heated to 100° C. for 20 seconds. The previously exposed areas will migrate away from the softenable material-substrate interface and toward the free surface of the softenable material producing a blueish color with increased transparency in these areas and the unmigrated particles, i.e., unexposed particles, will remain in their original position showing the original member's density. This results in a contrast density of approximately 1.

EXAMPLE II

An imaging member is prepared, charged and exposed as in Example I.

The member is then developed by immersing for a few seconds in 1,1,1-trichloroethane. The migrated particles and substantially all of the softenable material is washed away thereby leaving the complementary image on the substrate.

EXAMPLE III

An imaging member is prepared as decribed in Example I. In addition, a 1 mil Mylar layer is laminated to the free surface of the softenable material, opposite the substrate, as an overlayer of material. The member is then charged positive to a voltage which resulted in a field of 100 volts/micron. The member is imagewise exposed and heated, i.e., developed, as in Example I. An image is observed as described in Example I.

EXAMPLE IV

An imaging member is produced by preparing a softenable material comprising about a 12 weight percent solution of a custom synthesized about 80/20 mole percent copolymer of styrene and hexylmethacrylate having a molecular weight of about 41/300, intrinsic viscosity in toluene at about 25° C. of about 0.16. The softenable material is then coated onto an aluminized Mylar substrate with a gravure roller and then allowed to dry. The softenable material has a thickness of approximately 1.15 microns. The surface of the softenable material is then coated with amorphous selenium by the vacuum deposition process as fully described in copending application Ser. No. 813,345, filed Apr. 3, 1969. Vacuum evaporation of selenium onto the softenable layer results in an layer of particulate selenium being formed, having average particle size of about 0.25 micron.

The member is uniformly negatively charged to 100 volts and uniformly exposed to activating electromagnetic radiation of approximately 10 ergs/cm$^2$ of 4,000 angstroms light. The member is then exposed to vapors of Freon 113, trichorotrifluoroethane, available from E. I. duPont de Nemours and Co., for 30 seconds where upon all the particles migrate completely to the substrate and form the original member's density.

EXAMPLE V

The member as fabricated in Example IV, i.e., a member comprising a layer of softenable material overlying a substrate and said softenable material containing a layer of selenium at the softenable material-substrate interface, is imagewise positively charged with a corona charging device through a mask to positive 100 volts. The member is then exposed to vapors of Freon 113 for 30 seconds where upon the particles migrate away from the interface and to the free surface of the softenable material in image configuration and repack to form the original member's density in image configuration.

EXAMPLE VI

The member as fabricated in Example IV, i.e., a member comprising a layer of softenable material overlying a substrate and said softenable material containing a layer of selenium at the softenable material-substrate interface, is uniformly positively charged to 100 volts and then exposed to vapors of Freon 113, trichorotrifluoroethane, available from E. I. duPont de Nemours and Co., for 30 seconds where upon all the particles uniformly migrate away from the interface and towards the free surface of the softenable material.

The member is then imagewise recharged negatively to 100 volts and blanket exposed to activating electromagnetic radiation of 10 ergs/cm$^2$ at 4,000 angstroms light and then exposed to vapors of Freon 113 for 30 seconds where upon the imagewise charged areas migrate to the substrate in image configuration.

EXAMPLE VII

An imagaing member is produced by preparing a softenable material comprising about a 12 weight percent solution of a custom synthesized about 80/20 mole percent copolymer of styrene and hexylmethacrylate having a molecular weight of about 41/300, intrinsic viscosity in toluene at about 25° C. of about 0.16. The softenable material is then coated onto an aluminized Mylar substrate with a gravure roller and then allowed to dry. The softenable material has a thickness of approximately 2 microns. The surface of the softenable material is then coated with amorphous selenium by the vacuum deposition process as fully described in copending application Ser. No. 813,345, filed Apr. 3, 1969. Vacuum evaporation of selenium onto the softenable layer results in an layer of particulate selenium being formed, having average particle size of about 0.7 micron.

The member is charged negatively to 300 volts and then exposed to activating electromagnetic radiation of about 5 ergs/cm$^2$ of 4,000 angstroms light through a photographic transparency in contact with the member. The member is then heated to 80° C. for 1 second using a hot plate where upon the latent image is set against any change by subsequent light exposure. The member is then placed upon a microscope stage and heated by radiant energy from the substage of the microscope and while heating the member a migration image is observed being formed. The migration material migrates in image configuration forming an image comprising a color change from a red-orange, the color of the original member, to a blueish-orange the color of the imagewise areas which migrate. The member is recharged to positive 100 volts and placed upon the microscope stage and heated by radiant energy from the substage of the miroscope. The member is heated until all of the image which had been formed is erased, i.e., imagewise migrated back to the background material with no visible image present. It is observed that after a few seconds of heating the blueish-orange color is removed and the redish-orange color of the original member is restored and the image is erased.

EXAMPLE VIII

The same member and process steps as described in Example VII are carried out in this Example with the additional steps of recharging the member a second time negatively to 300 volts and then exposed to activating electromagnetic radiation of about 5 ergs/cm$^2$ of 4,000 angstroms light through a photographic transparency in contact with the member. The member is then heated to 80° C. for 1 second using a hot plate where upon the latent image is set against any change by subsequent light exposure. The member is then placed upon a microscope stage and heated by radiant energy from the substage of the microscope and while heating the member a migration image is observed being formed. The migration material migrates in image configuration forming an image comprising a color change from a red-orange, the color of the original member, to a blueish-orange, the color of the imagewise areas which migrate.

The member is recharged to positive 100 volts and placed upon the microscope stage and heated by radiant energy from the substage of the microscope. The member is heated until all of the image which had been formed is erased, i.e., imagewise migrated back to the background material with no visible image present. It is observed that after a few seconds of heating the blueish-orange color is removed and the redish-orange color of the original member is restored and the image is erased. No evidence of the previous image is observed.

EXAMPLE IX

An imaging member is produced by preparing a softenable material comprising about a 12 weight percent solution of a custom synthesized about 80/20 mole percent copolymer of styrene and hexylmethacrylate having a molecular weight of about 41/300, intrinsic viscosity in toluene at about 25° C. of about 0.16. The softenable material is then coated onto an aluminized Mylar substrate with a gravure roller and then allowed to dry. The softenable material has a thickness of approximately 2 microns. The surface of the softenable material is then coated with amorphous selenium by the vacuum deposition process as fully described in copending application Ser. No. 813,345, filed Apr. 3, 1969. Vacuum evaporation of selenium onto the softenable layer results in an layer of particulate selenium being formed, having average particle size of about 0.7 micron.

The member is then negatively charged to 300 volts, imagewise exposed to activating electromagnetic radiation, light, of approximately 5 ergs/cm$^2$, at 4,000 angstroms. The member is then heated to 80° C. for approximately 2 seconds. A slight imagewise color change is observed in which the imagewise migrated exposed areas are blueish-orange in color while the unexposed, unmigrated areas remain red-orange in color.

The member is recharged to positive 100 volts and heated at 80° C. for about 10 to 20 seconds. The image is erased whereby the original film color is observed thereby erasing the imagewise blueish-orange color. The imagewise areas returned to a red-orange color with no evidence of a previous image being formed.

EXAMPLE X

The same member and process steps as disclosed in Example IX are carried out in this Example with the additional steps of recharging the member a second time negatively to 300 volts and imagewide expose to activating electromagnetic radiation, light, of approximately 5 ergs/cm$^2$, at 4,000 angstroms. The member is then heated to 80° C. for approximately 2 seconds. A slight imagewise color change is observed in which the imagewise migrated exposed areas are blueish-orange in color while the unexposed, unmigrated areas remain red-orange in color.

The member is recharged to positive 100 volts and heated at 80° C. for about 10 to 20 seconds. The image is erased whereby the original film color is observed thereby erasing the imagewise blueish-orange color. The imagewise areas returned to a red-orange color with no evidence of any previous images being formed.

Local erasure is demonstrated in Examples VII and VIII in which the microscope is used for local radiant heating to locally develop a member in which the image was set by slight heating. These Examples demonstrate that local erasure of an imaged or non-imaged member by a technique such as local radiant heating can be performed. Therefore, a member may be locally erased or images reformed locally so that a member containing a large volume of material may be updated, changed, corrected by this local image erasure and local reformation. Local heating could be done by any suitable means including very localized radiation from lasers. The imaged or non-imaged areas outside of the locally heated areas are not effected.

What is claimed is:
1. A method of preparing a migration imaging member comprising:
   a. providing a member comprising a substrate, a layer of substantially electrically insulating softenable material on said substrate, said softenable material containing a layer of migration material contiguous an interface of said softenable material and said substrate, said softenable material capable of being softened sufficiently to allow migration of migration material in said softenable material;
   b. applying a reverse migration force to said migration material sufficient to cause migration of substantially the entire layer of migration material away from the substrate and towards the free surface of the imaging member;
   c. softening the softenable layer sufficient to allow migration of substantially the entire layer of migration material away from the substrate and toward the free surface of the softenable material;
   d. after step (c) applying an imagewise migration force to said migration material sufficient to cause imagewise migration of the migration material in depth in said softenable layer; and
   e. developing said imaging member by softening the softenable material at least sufficient to allow imagewise migration of migration material at least in depth in said softenable layer.

* * * * *